Figure 2:
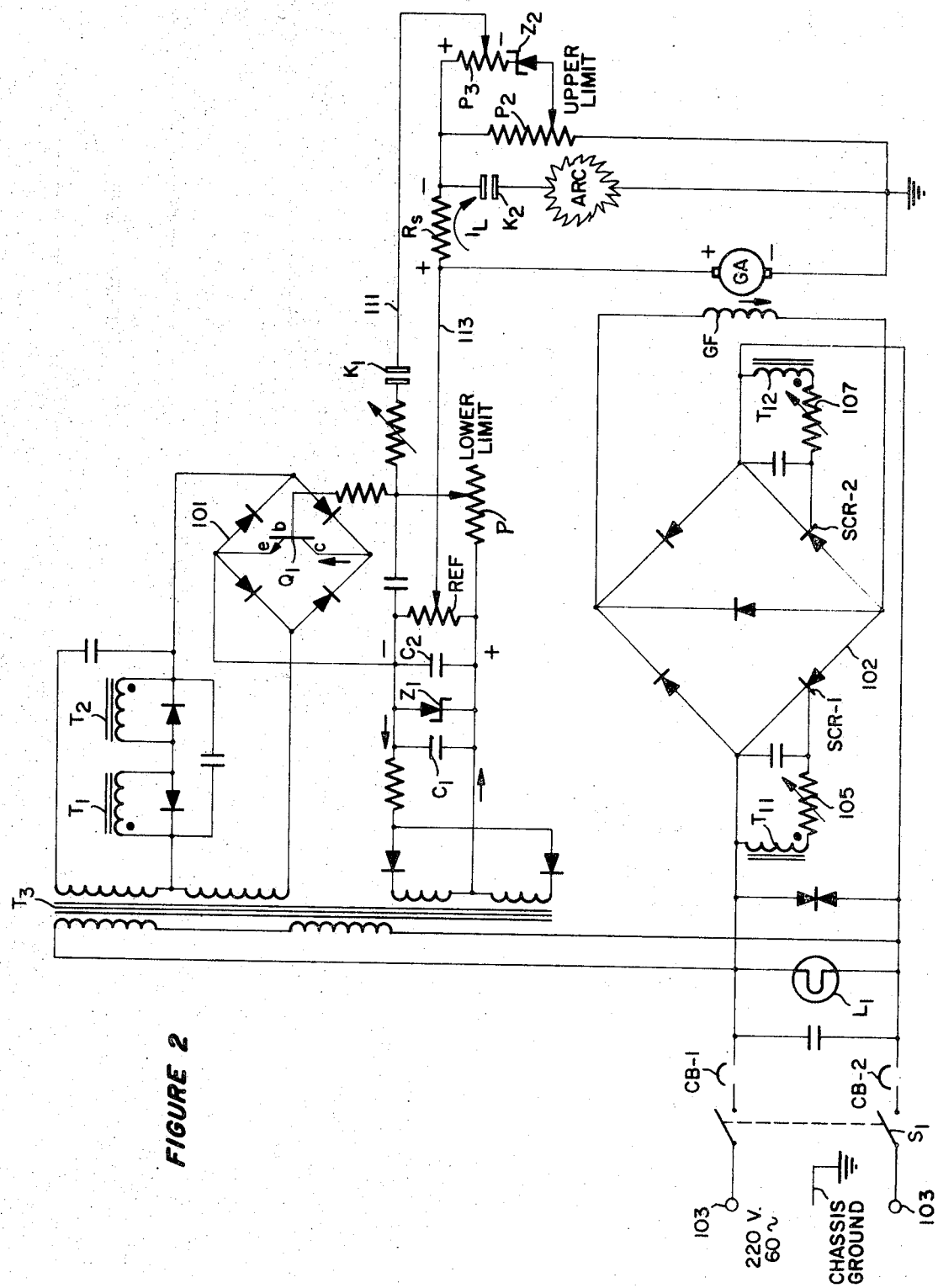

United States Patent

[11] 3,562,487

[72] Inventors: Jerome W. Nelson
Upper Arlington;
Wallace Leroy Gahm, Columbus, Ohio
[21] Appl. No 556,013
[22] Filed June 8, 1966
[45] Patented Feb. 9, 1971
[73] Assignee Esso Research and Engineering Company
Elizabeth, N.J.
a corporation of Delaware

[54] SYSTEMS FOR GENERATING A CONSTANT CURRENT WITHIN LIMITED VOLTAGE RANGES
16 Claims, 14 Drawing Figs.

[52] U.S. Cl. ............................................. 219/131, 219/130
[51] Int. Cl. ............................................ B23k 9/10
[50] Field of Search ................................ 219/131, 135, 108, 110; 323/1

[56] References Cited
UNITED STATES PATENTS

| | | | |
|---|---|---|---|
| 2,759,120 | 8/1956 | Cornell, Jr. .................... | 219/135X |
| 2,880,375 | 3/1959 | Cresswell ...................... | 219/131X |
| 2,924,750 | 2/1960 | Mulder .......................... | 219/135X |
| 3,021,420 | 2/1962 | Ruland, Jr. et al. ........... | 219/131 |
| 3,049,609 | 8/1962 | Purkhiser et al. .............. | 219/135 |
| 3,150,312 | 9/1964 | Willecke et al. ............... | 219/131X |
| 3,242,312 | 3/1966 | Pierce .......................... | 219/135 |
| 3,280,296 | 10/1966 | Nelson ......................... | 219/135X |
| 3,286,074 | 11/1966 | Lehnert et al. ................ | 219/131 |
| 3,299,250 | 1/1967 | Vilkas et al. ................... | 219/124X |

Primary Examiner—R. F. Staubly
Assistant Examiner—C. L. Albritton
Attorneys—Whelan, Chasan, Litton, Marx and Wright and Donald F. Wohlers ABSTRACT: Apparatus for generating a substantially constant current while allowing a predetermined amount of variation in a gated voltage suitable for use in electric arc welding employed in automatic pipe welding operations.

PATENTED FEB 9 1971
3,562,487
SHEET 1 OF 6
FIGURE 1
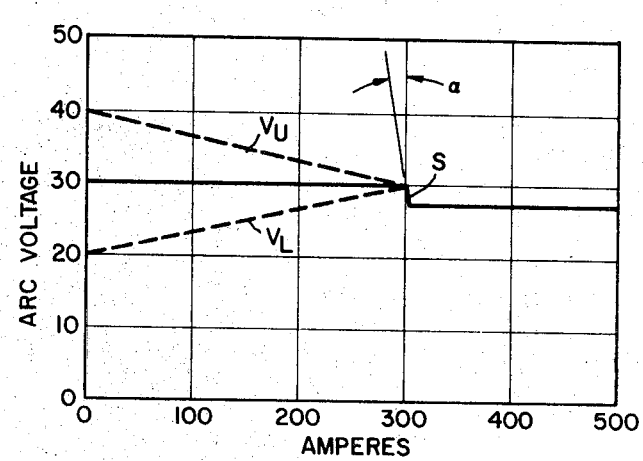
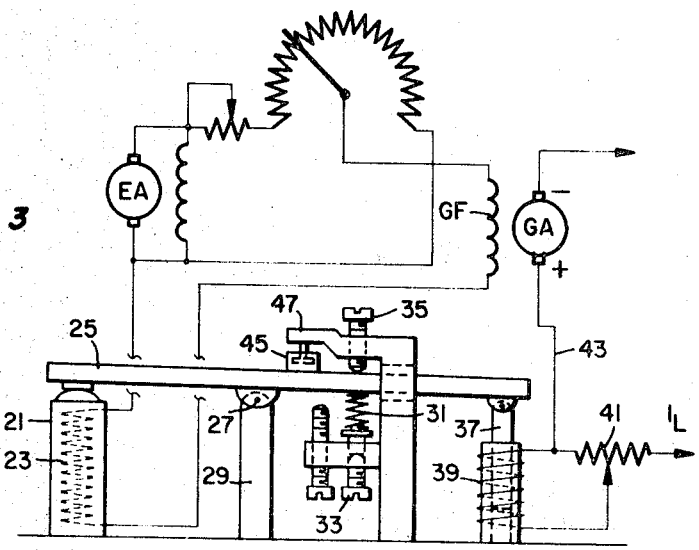
FIGURE 3
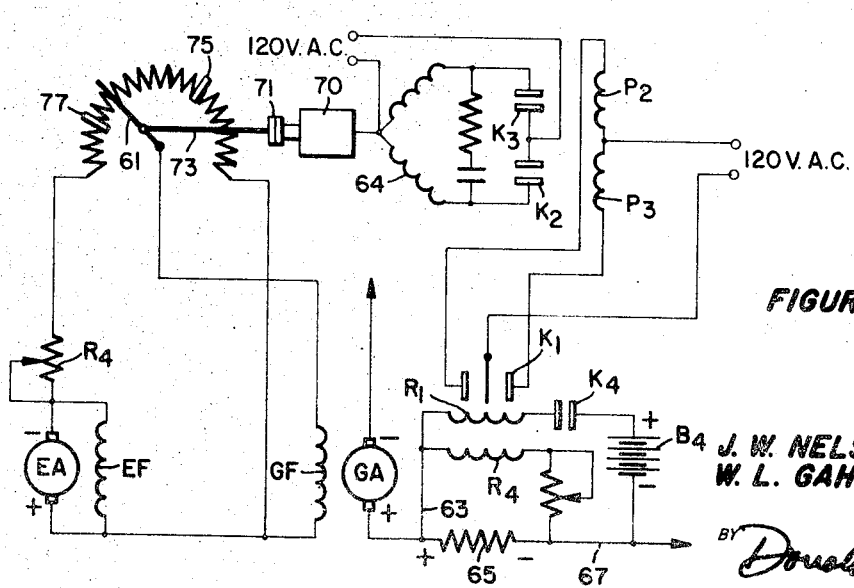
FIGURE 4
J. W. NELSON
W. L. GAHM
INVENTORS
BY Donald F. Mullins
PATENT ATTORNEY

J. W. NELSON
W. L. GAHM  INVENTORS

BY Donald F. Wohlers
PATENT ATTORNEY

J. W. NELSON
W. L. GAHM
INVENTORS

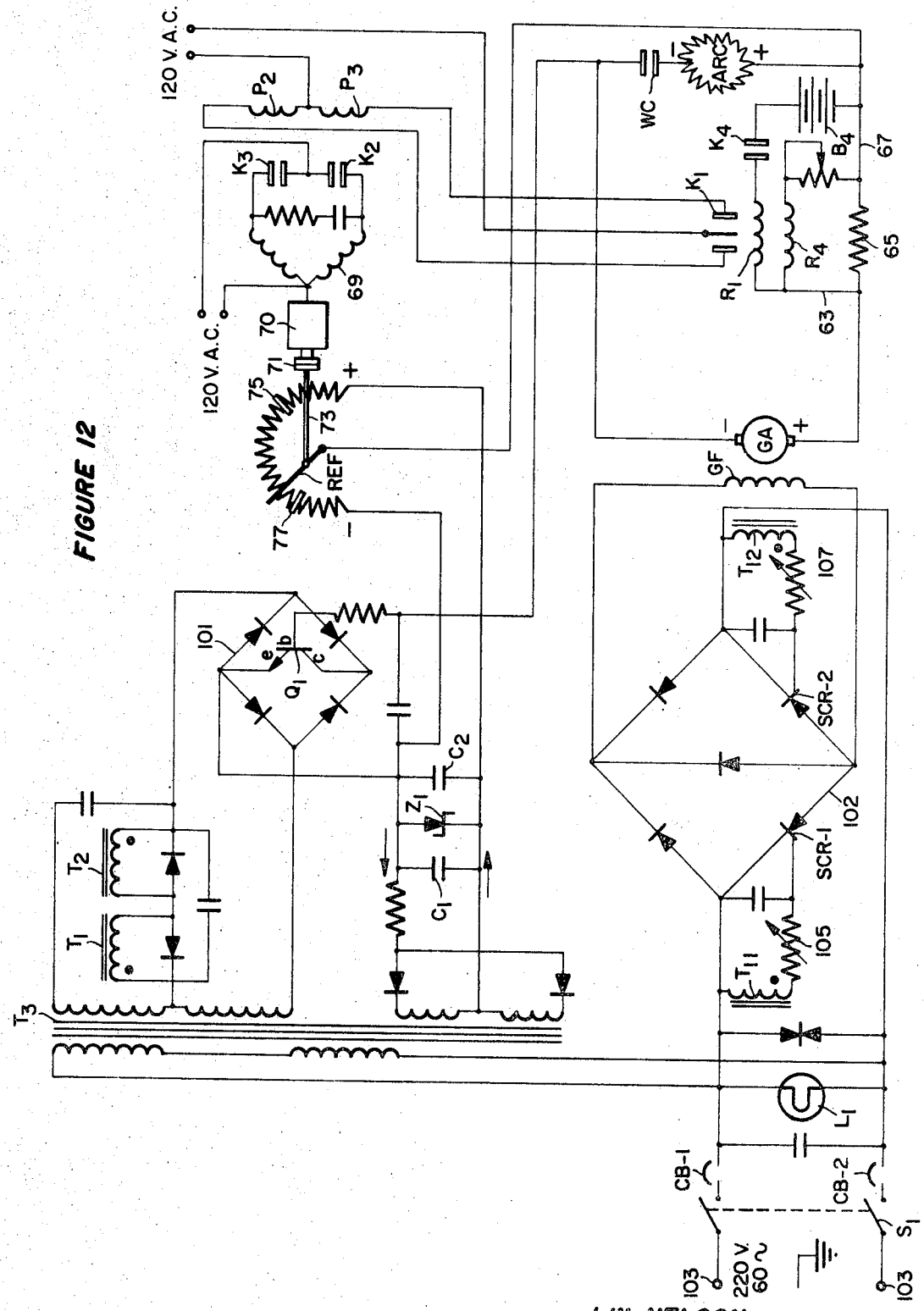

SYSTEMS FOR GENERATING A CONSTANT CURRENT WITHIN LIMITED VOLTAGE RANGES

The present invention relates to a system for generating a constant current within limited voltage ranges. More particularly it relates to a process and apparatus for generating a substantially constant current with a gated voltage of the range particularly suited for electric arc welding.

In U.S. Pat. No. 3,084,246 there is disclosed a process and an apparatus for welding structures such as pipelines, etc. The present invention is particularly concerned with improvements in the supply of electric power requirements for such process and apparatus. It is not necessarily limited, however, to the supply of electric power for welding, although the field welding of pipelines and analogous structures constitute a very important use of the present invention.

As set forth in some detail in the aforesaid patent, the rapid and automatic welding of metal structures, particularly of steel or ferrous metal structures, involves a large number of variables. Many such variables are named and discussed in U.S. Pat. No. 3,084,246. However, there are some additional factors which are of importance in the present case and the most significant of all such variables will be discussed briefly herein.

For example, in welding sections of tubular pipe together to form a pipeline it is usually necessary to form a girth weld around each joint without being able to rotate the pipe. This is called fixed-position welding. In certain types of pipe welding operations, on the other hand, a procedure known as double-jointing may be followed. In double jointing two sections of pipe are welded together end to end to form a butt joint. This may be done by rotating the two pipe sections under a welding head which is relatively fixed. In some aspects, the power system of the present invention is applicable to such a double-jointing procedure. The more complex welding problems arise, however, when the pipes to be welded are in nonrotatable position. Obviously, when a pipeline is built in the field by adding consecutive joints or lengths of pipe to a line already partially constructed, and often partly or largely buried in the earth, it is not possible to rotate such pipe under the welding head.

As further disclosed in the aforesaid patent, and in other patents relating to the same general process, such as U.S. Pat. No. 3,084,244, a procedure for pipeline construction has been devised whereby lengths of pipe to be joined by a girth weld are brought together in juxtaposed end to end position. Certain preparatory operations are then performed on the adjacent pipe end surfaces to make the joint ready for welding. Then the welding is carried out progressively and more or less continuously by moving a welding unit in a circular path around the pipe. In a preferred procedure, a narrowly spaced joint or kerf of rather precise dimensions is first prepared, either by accurately spacing the adjacent pipe ends a few thousandths or hundredths of an inch apart to form a gap of uniform dimensions or by cutting or grinding one or both pipe ends to such dimensions. The weld is then produced by introducing a filler electrode material and an electric arc into the gap.

The preliminary operations just mentioned commonly involve grinding or cutting the end surfaces of the pipe to remove irregularities therefrom and to leave a relatively narrow perpendicular walled gap of uniform dimensions around the circumference. This gap is designed to be filled with the welding material. The operation to prepare the joint surfaces may be performed, e.g. by a thin abrasive wheel rotating at high speed and traversed around the pipe joint. This grinding is done while the adjacent pipe ends are tightly clamped to keep them in proper position during the preparatory and welding operations. Alternatively, a suitable cutter rather than an abrasive grinder may be used to form the gap or kerf. The cutter, like the grinder, is rotated at suitable speed and is traversed around the circumference of the pipe at the joint. By taking suitable care, the joint in some cases may be precisely aligned and the pipe ends properly and accurately spaced without cutting or grinding, provided that both of the adjacent pipe ends have smooth, uniform and perpendicular end surfaces. The establishment of uniform and suitably spaced end surfaces is referred to hereinafter as preparation of the joint. The reasons for requiring gap uniformity, etc. are discussed in some additional detail in the patents mentioned above. For purposes of the present invention, it is important to note that the formation of a girth weld in a narrow gap or kerf of the character just described requires, for best results, a source of electric power which supplies a substantially constant current. The maintenance of an effective, efficient welding arc also requires a gated voltage, i.e. a voltage which can fluctuate only within certain limits. In general, it is desirable to maintain a constancy of current within ±2percent while allowing voltage variations which are somewhat wider but still within ±15percent.

For convenience, the various factors, including current and voltage at the welding arc, which influence the quality of the weld ultimately produced may be referred to as parameters. There are quite a number of such parameters. Some of them cause greater difficulties than others. In general, these parameters are variables which can be independently adjusted and brought to a desired value by taking suitable care. The major parameters are listed as follows.

1. Design of the welding joint per se.
2. The gap width or spacing between adjacent members at the joint.
3. The nature of the shielding gas used while the weld is being made.
4. Composition of the electrode filler material, preferably a slender wire, together with the composition and nature of its surface coating, if such a coating is employed.
5. Diameter of the filler electrode, usually a slender wire.
6. Travel speed of the welding head with respect to the surface at the welded joint.
7. Speed of electrode or filler wire feed or advancement.
8. Welding barrel angle (the angle at which the welding wire or electrode enters the joint).
9. The distance between the contact tube and the work (CTWD or "stick out").
10. The voltage, either steady or programmed variable, between electrode (or welding head) and the joint.
11. The rigidity or firmness and accuracy with which the parts being welded are held during the operation.
12. The dynamic response of the welding power supply source.
13. The temperature condition, e.g. degree of preheat, of the materials being welded, particularly if a preheat is used.
14. The nature and heat conductive properties of a weld backup structure, if such is used.
15. The position of the filler wire or electrode in the joint and the frequency and nature of variations in such position.

In typical pipeline welding as practiced according to the teachings of the patents mentioned above, the parameters 1 to 12 and 15 generally apply. Parameters 13 and 14 usually apply only in special cases.

Other parameters which may be encountered less frequently may include such items as the method of shielding during welding, the type of flux or electrode coating, if such is used, etc. If all the parameters listed above, or all such as are applicable, can be well controlled, excellent welds can be produced automatically by the general procedures described in the aforesaid patents. Under such conditions a substantially continuous arc is produced from beginning to end of a given weld operation. Under such conditions the weld is of uniform quality.

To obtain this result, it is particularly important to see that the welding current is maintained at a substantially constant value. Variations in one or more of the above parameters will tend to give rise to certain difficulties and defects, but the maintenance of a substantially constant current tends to minimize or eliminate some of the most important variables which otherwise would cause trouble or produce defective welds.

According to the present invention it has now been found possible to maintain a close control over the welding current to keep it close to a steady value (except for minor instantaneous variations which are largely self-correcting) and also to accomplish this with only limited variation in voltage. By constant current, it will be understood that the current is maintained within about ±2 to 3 percent, desirably ±1 percent or as near it as possible, of the mean current value.

In the past, as noted in U.S. Pat. No. 3,084,246, it was considered important to maintain a substantially constant voltage or potential on the electric arc during the welding process. While it is still desirable to keep the voltage within fairly narrow limits, circa ±15 percent of a mean value, it is even more important to control the current within substantially narrower limits. As a matter of fact, some narrow variations in applied potential have been found to be desirable to obtain high quality welds. Thus, in starting the welding, slightly higher voltage is required than at certain later stages during the welding operation. This is more fully explained in the copending application of Nelson, Ser. No. 402,401, filed Oct. 8, 1964, now U.S. Pat. No. 3,280,396.

In obtaining a sound weld between two adjacent structures such as lengths of large diameter steel pipe, for example, it is highly important that the weld penetrate to the base or root of the joint. In other words, a strong weld or seam must be formed at the inner surface of the pipe, in the case of a pipeline girth weld. When the welding is accomplished, according to the preferred procedure, by feeding a relatively slender electrode wire at a predetermined rate into the narrow gap, it is essential that the "penetration" or depth be controlled, i.e. the point at which fusion or burning off of the electrode material occurs. This is necessary to obtain proper fusion of the electrode with the abutting members being joined.

This control of penetration of the slender electrode wire into the weld gap is an extremely important factor in obtaining good welded joints. The actual penetration obtained tends to vary somewhat with the instantaneous position of the welding head around the joint. Thus, in welding a pipeline joint, penetration will tend to be different at the top than at the sides or bottom of the pipe. This is due partly to the effect of gravity and analogous forces, e.g. surface tension and capillary action, on the molten material and due partly to the dynamic force of the arc itself. The force of gravity and of the arc itself tend to push mobile material such as molten metal into positions which may vary from those desired.

In welding pipelines in the so-called fixed position, discussed above, other conditions must be adjusted and developed to tolerate certain variables which cannot be avoided. Fortunately, most of the variables or parameters which normally cannot be avoided, such as the particular instantaneous weld position required, with accompanying gravitational effects, etc. are usually positive parameters in the present process. This is true also of several other conditions which are not entirely uncontrollable but are frequently most difficult to control.

For efficient welding of large pipelines and other structures of similar materials and magnitudes, the electric current at the welding arc must be a rather heavy one. Prior art power systems as used in the field generally have not been capable of supplying large and very nearly constant currents while at the same time permitting only moderate voltage variations. The latter may be referred to as gated voltages.

Therefore, a primary purpose and object of the present invention is to supply a steady, dependable and relatively heavy electric current of substantially constant value while permitting only narrow voltage fluctuations within predetermined limits. By heavy current, is meant one of the order of hundreds of amperes.

A more particular object is to devise a current control system, capable of use with commercially available DC shunt generators or with other sources of heavy direct current, such as rectifiers, which will hold the current values within about ±1 percent of a steady optimum value for voltage variations not exceeding about 15 percent, and preferably not exceeding 10 percent, these controls being effective continuously under normal welding operations at different positions around a fixed pipe.

Another object is to design relatively simple equipment which at the same time is rugged and reliable for the type of service just described. Further objects are to provide several alternative designs of such equipment.

Figure 5:
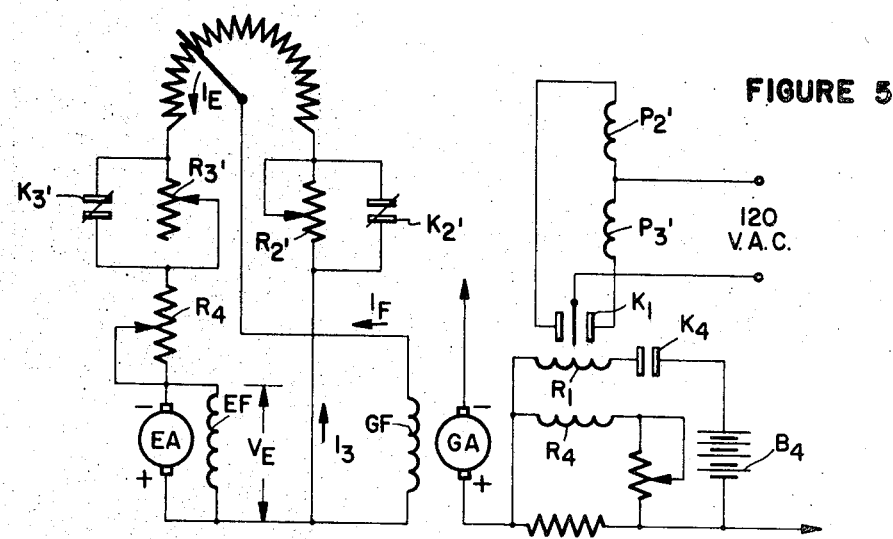
Figure 6:
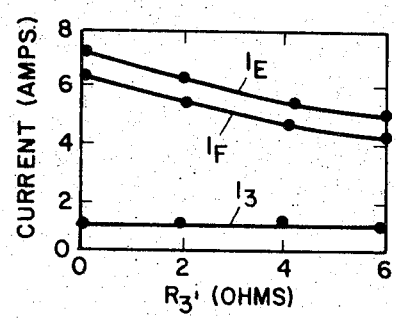
Figure 7:
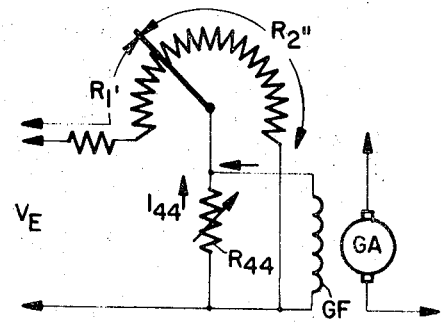
Figure 10:
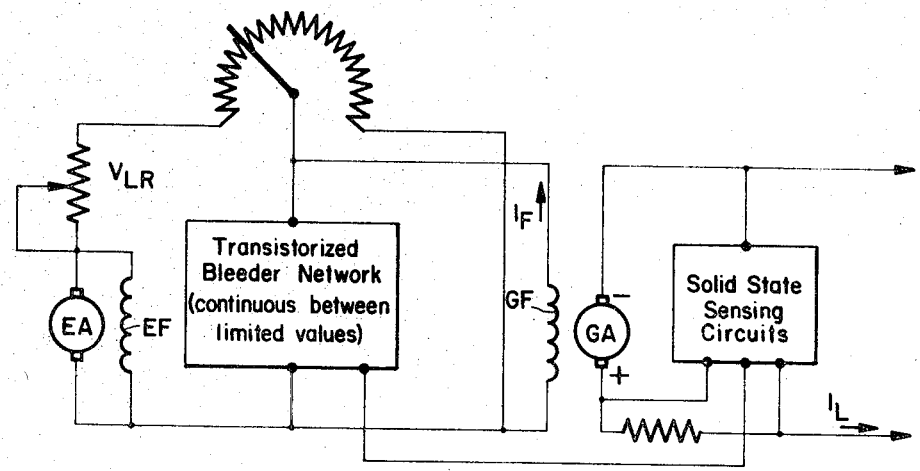
Figure 8:
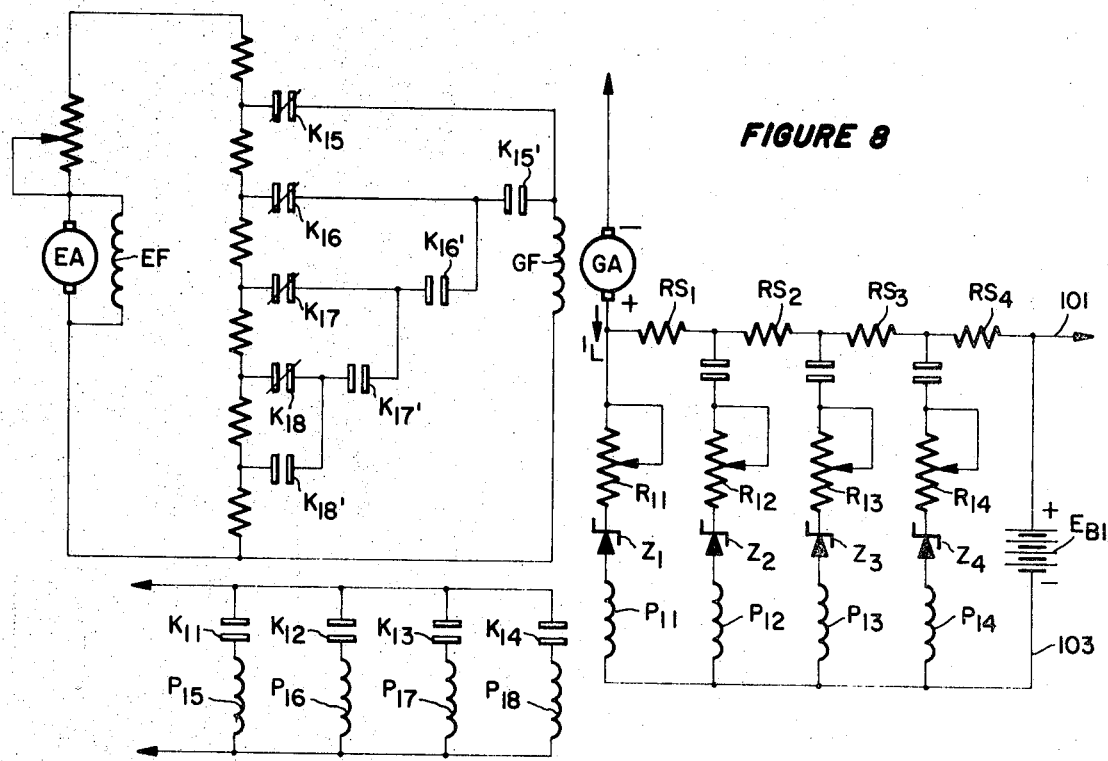
Figure 9:
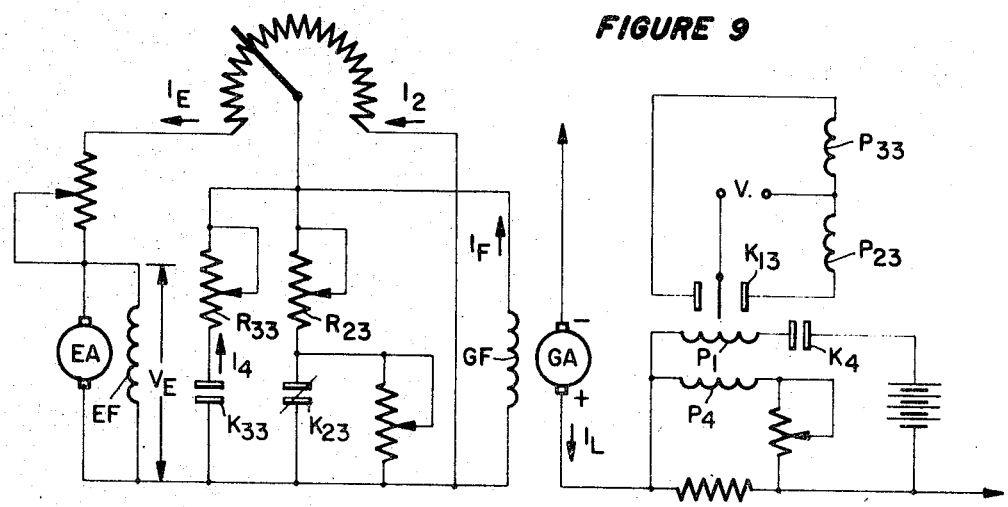
Figure 11:
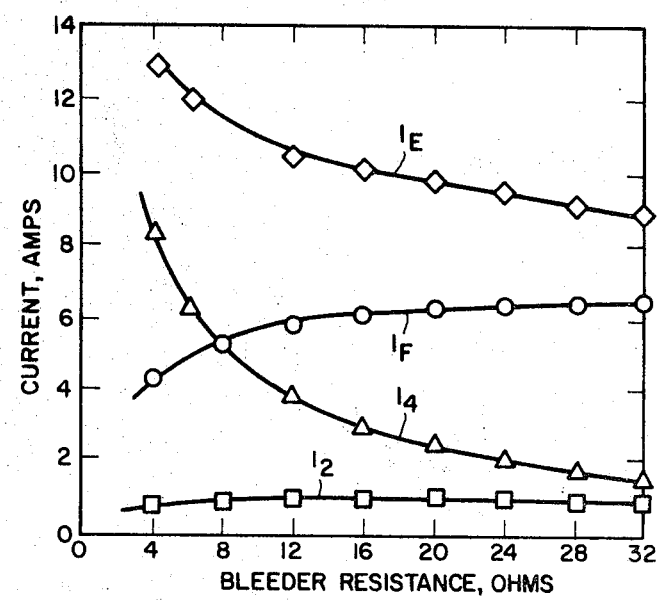
Figure 13:
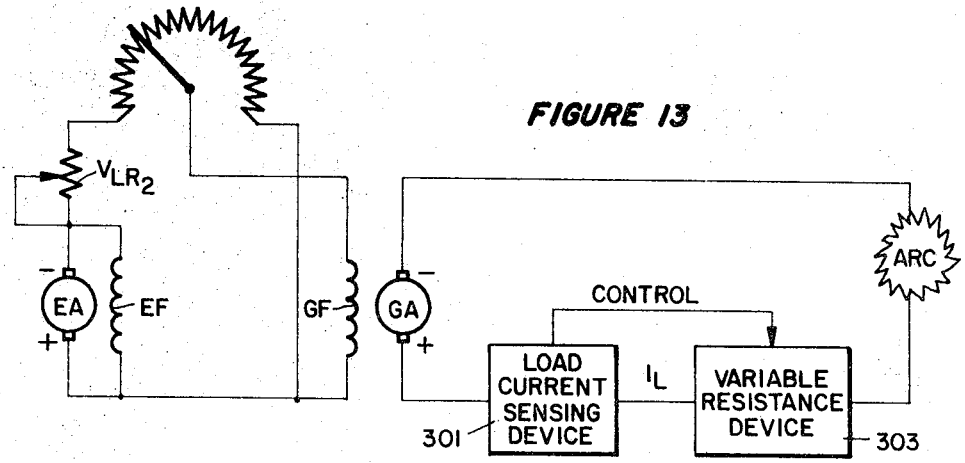
Figure 14:
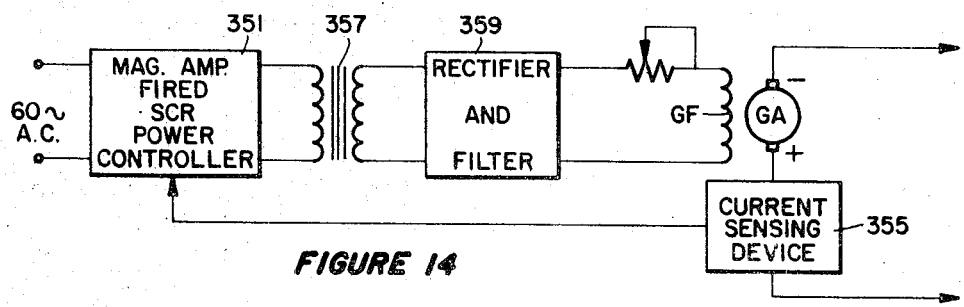

Other and ancillary objects will suggest themselves to those skilled in the art, as this description proceeds. Therefore, reference will next be made to the accompanying drawings which illustrate particular features and presently preferred embodiments of the present invention. In the drawings, FIG. 1 is a simple graph showing a desirable voltage-current relationship which can be obtained by the present system, FIG. 2 shows diagrammatically a preferred arrangement of voltage-current regulating system which is capable of close current control over a power source while permitting moderate but limited voltage variations according to the principles of the present invention, FIG. 3 shows a modification for accomplishing a similar result in which rather simple electromechanical means are employed to impose current control on a power source, specifically a direct current generator, while permitting some reasonable latitude of voltage fluctuation, according to the principles of this present invention, FIG. 4 illustrates diagrammatically another modification which makes use of a motor-driven rheostat regulator, FIG. 5 shows another modification which is a variation on the system of FIG. 4, FIG. 6 is a graph showing some typical relationships between field rheostat resistance on the one hand and field and bleed currents on the other, in systems of the type shown in FIG. 5, and for one set of exciter and field parameters, FIG. 7 illustrates a generalized form of a control system having the fundamental characteristic controls of FIG. 5, as well as a bleeder resistor across the generator field, FIG. 8 illustrates a further modification wherein use is made of a selective step voltage divider for control of the working current, FIG. 9 shows still another modification wherein use is made of a relay-controlled field bleeder in the control elements, FIG. 10 illustrates a modification which embodies solid-state elements in a continuous current control mechanism, FIG. 11 represents for one set of exciter and field parameters typical graphs of operating characteristics particularly applicable to the field bleeder type of controller, e.g. such as is shown in FIG. 9, FIG. 12 shows a system combining essentially those systems shown in FIG. 2 and FIG. 4, FIG. 13 shows a modification based on use of a load current sensing device and a variable load resistance for control, and FIG. 14 shows a system which makes use of an alternating current power supply to provide controlled direct current for a generator field.

Referring now to the drawing in detail, FIG. 1 shows some operating characteristics which are found desirable and even essential for the high-speed type of welding previously mentioned. Assuming a typical welding voltage of 25 to 30 volts, with a median of 27.5 volts, a variation of about ±10 percent in either direction from the mean is considered to be allowable during the actual welding. In some situations, the voltage variation will be wider or narrower.

Under starting conditions a higher voltage $V_U$ may be required momentarily to start the arc. This may possibly go as high as 40 volts. Also, the voltage may drop as low as $V_L$, e.g. to as low as 20 volts under extreme conditions as when the arc is being extinguished. The normal welding voltage, let it be assumed, will not be greater than $V_a$, about 30, nor less than $V_n$, about 25 volts. The slope S on the "constant" current, (i.e. very nearly constant), shown at the 300 ampere level, is important. It is desirably quite steep approaching but not quite reaching absolutely vertical because of the difficulty of maintaining stability.

In starting out, let it be assumed that the generator will produce the desired current of, say 300 amperes, with a field current of 5.2 amperes and an exciter terminal voltage of 100. The desired generator output potential is 27.5 volts. At the 300 ampere operating level, the voltage gain of the generator is 27.5/5.2, or about 5.3 volts per ampere. On this basis a voltage change of ±2.5 volts will require a field current change of about ±0.47 amperes. In other words, holding generator output current constant, voltage output may be raised or lowered, within limits, to take care of moderate resistance fluctuations at the welding arc. The problem, then, is how to impose such a control on the potential as to keep the current constant (within 1 percent or less) as the unavoidable variations in resistance come along, and to do this without wide voltage fluctuations. The various systems for accomplishing this will now be described.

FIG. 2 shows a presently preferred system which comprises an alternating power supply, an upper "firing" circuit section controlled by solid state devices, an intermediate reference and limiting section, and a lower SCR-controlled power section which supplies direct current to the generator field in such a way as to keep the generator output current constant and to gate or limit the generator output voltage. It is assumed, of course, that the actual arc conditions are not widely unstable. The inductance of the generator field, GF, is a stabilizing factor against sudden or wild fluctuations in current or voltage output at the armature, GA. A rectifier source can be used instead of the generator, if desired.

As is well known in the art, an SCR unit can be used to control the "firing angle," i.e. to cut off part of the AC wave. The SCR unit will pass no current until a pulse is applied to the gate and the anode is positive with respect to the cathode. Then, as these conditions are reached, the SCR unit will fire and pass the remainder of the power wave to the load circuit. When polarity changes at the SCR unit, the device is self-quenching and has to be triggered again for the next pulse. Two SCR units, SCR-1 and SCR-2, are shown in the bridge circuit in the lower part of FIG. 2. One operates on each half-cycle of the AC input, and this arrangement per se is known in the art.

A small current-rectifying bridge circuit 101 is employed to supply bias current to triggering transformers $T_1$ and $T_2$. The elements $T_1$, $T_{11}$, and $T_2$, $T_{12}$, respectively, of these transformers are shown separated in the drawing but they are closely coupled in the actual physical arrangement. This bias current is so adjusted as to set the times in the alternating current cycle when the SCR-1 and SCR-2 elements, respectively, will fire. Alternating current of standard commercial type is supplied at terminals 103. A power transformer $T_3$ supplies power to the upper part of the circuit, including the small bridge 101. Bridge 101 and associated inductor and capacitance elements control or limit the pulses imparted by the two triggering transformers $T_1$ and $T_2$ previously mentioned. The resistances 105 and 107 are adjustable. A transistor $Q_1$, in the small bridge, normally receives a relatively small current at its base $b$ which causes a larger current to flow from its collector $c$ to its emitter $e$, and hence amplifies the incoming signal. For one polarity of the applied 60 c.p.s. voltage, the triggering transformer $T_1$ functions; the other transformer $T_2$ functions for opposite polarity. The upper circuit, which is isolated from the AC power supply, can be connected and actually is connected to the generator output circuit through leads 111 and 113 when a contact $K_1$ is closed. The triggering transformers $T_1$ and $T_2$ operate alternately to trigger first one and then the other SCR unit in the large bridge circuit 102. The result is to supply unidirectional current to the generator field GF.

A reference voltage power supply is incorporated in the middle circuit which is a control circuit and includes leads 111 and 113. This voltage is obtained through a reference potentiometer REF and is stabilized through capacitors $C_1$ and $C_2$ and a zener diode, etc., to give a good steady voltage value at normal operating conditions. Upper and lower limits will be set as explained below.

When contact $K_1$ in line 111, shown as open in FIG. 2, is closed, current will flow through line 111 into the base $b$ of the transistor $Q_1$ in the small bridge circuit. Base current can be adjusted with $K_1$ open down to a lower limit by the potentiometer P. The current which will flow through the base $b$ is a function of voltage applied thereto with respect to its emitter $e$. As current flows from the generator to the welding arc, there is a voltage drop through resistance $R_s$ in the main circuit. If $K_1$ is closed and this drop is less than the reference voltage developed across the upper portion of the potentiometer REF, which is connected in series relation with resistance $R_s$, then there is developed an error voltage of positive value that is applied to the base $b$ thereby to cause the transistor $Q_1$ to conduct and therefore current from line 111 will flow through base $b$. Conversely, if the error voltage, i.e. the sum of the voltage developed across the upper portion of the potentiometer REF and the voltage drop through $R_s$ is negative, this voltage applied to the base $b$ will cause transistor $Q_1$ to shut off entirely, except for a lower limit current supplied by the positive voltage applied directly to the base $b$ from the potentiometer P. Thus, the conduction of transistor $Q_1$ and accordingly, the current flow therethrough may vary from substantially zero (cutoff) to complete saturation, depending on the voltage applied to its base $b$. Therefore, transistor $Q_1$ effectively functions as a variable impedance controlled by the error voltage applied to its base $b$.

Hence, if the load current, that is the arc current, shown in FIG. 2 as coming from the generator should decrease, the $R_s$ voltage drop decreases. The error voltage applied to $b$ then increases, and the transistor $Q_1$ conducts more current, which in turn is supplied to the trigger transformers $T_1$ and $T_2$. This increased current flow induces a corresponding voltage in $T_1 1$ and $T_{12}$ during their respective operating half-cycles, which hastens the firing of the SCR associated therewith. Hence, the firing angle at SCR-1 and SCR-2 decreases. This permits more current to flow through the field GF which will raise the current output of the generator. When the load current at the arc increases, on the other hand, the potential on $b$ drops, $Q_1$ conducts less and consequently the SCR units fire later, and the power supplied to the field decreases. Instead of a generator and armature, a rectifier with a saturable reactor may supply the power and be controlled in the same way.

The full wave rectification circuit, which comprises the larger bridge circuit, is conventional and per se forms no part of the present invention. Such circuits have been used for various DC loads in the past. However, the upper and lower limits devices, which are applied respectively at a potentiometer $P_2$, in parallel with the load circuit, and at P as previously described, involve novel and important controls which are characteristic of the present invention.

Under some welding conditions, e.g. in welding a fixed position pipeline girth joint, there is often a tendency to produce a so-called arc crater at the top of the pipe as the weld is terminated. This crater is due to the manner in which the arc is extinguished. By opening the contact $K_1$ in line 111, however, momentarily, the crater can be filled smoothly. The contact $K_1$ will be closed when the arc starts up again. A solenoid, not shown, but under control of the generator or other supply current, e.g. at $R_s$, may be used, if desired, to close $K_1$ automatically on starting up the arc.

The operation and function of the upper limit control will now be explained more fully. As the voltage applied to the arc reaches a level sufficient to cause breakdown of the zener diode $Z_2$ which is in parallel with the arc, current will flow through $Z_2$. Potentiometer $P_2$ is adjusted so that at the maximum permissible arc voltage, e.g. 30 volts, current will flow through the zener diode. When the breakdown voltage is thus exceeded in the zener diode, a substantial voltage is produced across the parallel potentiometer $P_3$. This adds to the voltage across $R_s$ and opposes the reference voltage at REF, the upper portion of which is in series circuit relation with $R_s$ and $P_3$. As a result, the current that can flow through the base of the transistor $Q_1$ is limited to that which sets the upper limit voltage across the arc.

As to the lower limit, a small base current is allowed to flow through transistor $Q_1$ at all times. A field current will flow through the main generator; this is a function of the current passing through the transistor. With the voltage drop through $R_s$ below that of REF, there will always be at least a small current, under control of P, passing through the transistor $Q_1$ and the generator field current cannot drop to zero. This puts a lower limit on voltage output.

Referring to FIG. 3, there is shown a carbon pile controller which makes use of the variations in resistance of a pile of carbon granules under different degrees of pressure to control the generator output. The carbon pile 21, represented as a (variable) resistance 23 is confined laterally and has pressure applied to it by one end of a moveable bar or lever 25. The latter is pivoted at 27 to a rigid support 29. Towards its other end, lever 25 is urged upwardly by a compressed spring 31 which can be adjusted upwardly or downwardly to change the force applied to the lever by means of a screw 33 on which spring 31 is mounted. An adjustable opposing screw 35 is mounted above the lever 25 to set a limit to the upward movement of lever 25 at this point. The right end of the lever is attached pivotally to the plunger 37 of a solenoid which has a winding 39 in parallel with a variable resistance 41 in the positive output line 43 from the generator armature GA. A dashpot 45 is provided between lever 25 and a fixed bracket extension 47 which supports the limit screw 35 so as to prevent chattering of the lever 25.

With a given setting of resistor 41, the generator load current produces a down pulling force which is approximately proportional to the generator output current. The preloaded spring 31, however, prevents the lever from moving until the load current reaches an assigned value. After that point, any further increase in current pulls the right end of the lever down and reduces the force compressing the carbon pile. Hence as the load current $I_L$ further increases, the resistance of the carbon pile increases. This decreases the field current, which passes through the carbon pile and hence drops the generator output voltage and current.

By varying the resistance in the variable shunt 41, the effective slope of the portion S of the graph in FIG. 1 may be varied or controlled as desired.

Referring next to FIG. 4, a motor-driven rheostat arm 61 is used to control the voltage-current characteristic of the generator GA. A synchronous motor is driven reversibly under control of relay-operated $K_2$ and $K_3$ which can be closed alternatively. These are under control of relays $P_2$ and $P_3$, respectively. Relays $P_2$ and $P_3$ are selectively operated by the relay-operated double-throw contacts $K_1$ under control of a relay $R_1$. The relay $R_1$, in turn, is in a circuit which can be closed by a contact $K_4$. The latter is operated by a relay $P_4$ in a shunt circuit 63 across a small resistance 65 in the generator output line 67. Relay $R_1$ with its contact $K_1$ is a sensitive polarized relay such as the Barber Coleman type 7300-100. Its pull-in voltage is 0.023, and when the change in voltage across 65 due to load current variations in either direction away from some desired value (say 300 amperes) exceeds 0.023 volts, the contacts $K_1$ will be actuated in one direction or the other from their normal open setting. When this happens, relay $P_2$ or $P_3$, as the case may be, will be operated to close the contacts $K_2$ or $K_3$. This will energize the synchronous motor (e.g. a "Slo-syn" motor) winding 69 to drive the motor 70 in the appropriate direction to adjust the rheostat arm 61 through a slip clutch 71 and a connection 73. Limit stops 75 and 77 prevent movement of the rheostat arm 61 beyond safe limits, whereupon the clutch 71 will slip.

The relay $R_4$ is set to operate at the desired amperage midpoint of the operating range. It will hold contact $K_4$ closed over this range, say ±5 amperes. A battery $B_4$ opposes the shunt voltage so that contacts $K_1$ are balanced open when the current is right but will close in one direction or the other as the load current changes. The circuits for relays $P_2$ and $P_3$ and for the synchronous motor 70 have their own independent power sources.

The rheostat 61 of FIG. 4 can be replaced with a lever and carbon pile arrangement, as in FIG. 3, if desired, so that the synchronous motor will change the pressure applied to the carbon pile and obtain the same kind of control as in the case of FIG. 3.

Also, instead of using a motor-driven rheostat under control of reversible relay $R_1$, as in FIG. 4, separate variable resistors may be placed on each side of the rheostat of FIG. 4 and their values adjusted step by step as the relays $P_2$ and $P_3$ are operated. The synchronous motor 70 can be eliminated and normally closed contacts corresponding to $K_2$ and $K_3$ placed in shunt with the respective variable resistors. When $K_2$ and $K_3$ are closed, no change occurs; when one or the other is opened by its relay, that part of the circuit changes in value to change the field current in one direction or the other.

Such a system is shown in FIG. 5. For example, with $K_3'$ closed and $K_2'$ open, field current will increase because resistance $R_3'$ is shunted out and $R_2'$ is in. When the reverse is true, i.e. $K_3'$ open and $K_2'$ closed, the field current is reduced because resistance $R_2'$ is shunted out and $R_3'$ is effective. A variable resistor $R_4$ is shown between the exciter armature and the rheostat in both FIGS. 4 and 5. FIG. 6 shows resistance-current relationship for the case just mentioned, with $K_3'$ open, $K_2'$ closed, and resistor $R_3'$ adjusted to different values. That part of the exciter current which is shunted around the main field is shown in the graph at the bottom and field current total exciter current are shown respectively below the top and at the top. All three can be changed in the same direction by adjusting $R_4$.

FIG. 7 shows a rather simple modification in which a resistance $R_{44}$ is placed in parallel with the field to act as an adjustable current bleeder.

FIG. 8 illustrates a control system wherein the field current is varied in steps selectively. This system makes use of zener diodes through which essentially no current flows until a desired or specified potential is reached and then that potential is maintained essentially constant regardless of the current flowing. A series of contacts operate sequentially as needed to step in or step out resistance and thus to control the current and voltage output. These have the advantage of cutting down the step sizes and achieving more nearly a smooth control from one extreme of operation to the other.

Referring further to FIG. 8, the generator positive output line 101 runs through a series of low value resistors $RS_1$, $RS_2$, $RS_3$ and $RS_4$. A shunt circuit across each of these resistors includes a variable resistor $R_{11}$, $R_{12}$, $R_{13}$ and $R_{14}$ and a zener diode $Z_1$, $Z_2$, $Z_3$, $Z_4$. Each circuit includes also a relay coil, $P_{11}$ to $P_{14}$, respectively. Each circuit also connects back to the main generator positive line through line 103 and battery $E_{B1}$.

The arrangement just described is, in effect, a voltage divider network which replaces the variable field rheostats, e.g. of FIGS. 4, 5, and 7. The point on this voltage divider to which the generator field is connected depends on which of the relays $P_{11}$ through $P_{14}$ is energized as a function of the magnitude of the load current $I_L$ through the resistors $R_{S1}$ to $R_{S4}$. Relays $P_{11}$ to $P_{14}$ respectively close contacts $K_{11}$ to $K_{14}$ in the intermediate control circuit at the left and energize relays $P_{15}$ to $P_{18}$. By using the battery bias voltage $E_{B1}$, the zener diodes $Z_1$ to $Z_4$, and the variable resistors $R_{11}$ to $R_{14}$, one can achieve sharp on and off operation one by one of the various elements of the field circuits. As the load current $I_L$ increases through the preset range, the relays operate only one at a time to cut in more and more series resistance to the field. Increase in the load current thus results in lower voltage to the generator field. This, in turn, cuts down the field current which of course reduces the generator output. Normally closed contact $K_{15}$ opens immediately after normally open contact $K_{15}'$ closes as relay $P_{15}$ is energized, etc.

Referring next to FIG. 9, a system is described which includes a field bleeder controller. In this system the detector circuit which is essentially the same as that in FIG. 4 or FIG. 5 places resistance in parallel with the generator field to effect the desired corrective change. In other respects the operation is much like that of FIG. 5 and need not be explained in detail.

FIG. 10 describes a system which makes use of solid-state sensing circuits in the generator output and a transistorized bleeder network. The latter is designed so as to give continuous variations between maximum and minimum resistance values. It is therefore a continuous type of controller. Upper and lower limits are placed on the range of the generator field voltage.

FIG. 11 shows graphically some typical current values for the field bleeder-type control. In effect this arrangement takes more current from the exciter to give control over the generator field. This relates particularly to the system of FIG. 9 but in principle is applicable to the other systems as well. The exciter current in the upper curve decreases as the generator field current increases.

FIG. 12 shows a system combining two previously discussed systems shown in FIG. 2 and FIG. 4. The new system in FIG. 12 has many advantages of both systems. It has a sharp knee in volt-amp. characteristic where gating steps take place, a quality of the system in FIG. 4, and has a faster welding generator response time and precision control of the upper and lower voltage limits, a quality of the system in FIG. 2.

The system in FIG. 12 is a dual servosystem that has the reference section of one servosystem controlled by the other system. The servosystem of FIG. 2 is wired in FIG. 12 to control welding voltage instead of welding current and is made a slave of the system from FIG. 4. The system from FIG. 4 still controls welding current as previously described, but is now mechanically attached through motor shaft 73 to the arm of the reference potentiometer from system 2 instead of to the rheostat arm 61 of the generator GA. As shown in FIG. 12, the feedback signal of the FIG. 2 section is now taken across the welding arc and weld contactor WC. The FIG. 2 section of the overall system can be considered a separate closed-loop system that maintains the welding voltage to whatever value the reference potentiometer REF is set by supplying a controlled amount of current in the welding generator field windings. Mechanical stops 75 and 77 are employed to limit (gate) the voltage values that can be selected on the reference potentiometer REF as was done with the rheostat arm 61 in the system of FIG. 4. Therefore, as in the system of FIG. 4, the motorized servosystem can adjust the welding voltage within preset limits to maintain a desired welding current.

The system of FIG. 2 as modified for the system in FIG. 12 can be used with other systems in a similar fashion as with the system in FIG. 4. Any system such as that in FIG. 4 which supplies a mechanical motion to the arm of rheostat 61, or a system that changes the voltage across the rheostat by varying resistance normally in series with the rheostat 61, or a system that substitutes resistance combinations for rheostat 61 of the generator can be used in like fashion to alter the reference voltage in the FIG. 2 section of the system in FIG. 12. This would include systems shown in FIGS. 3, 5, 8, 9, and 10.

FIG. 13 is a system designed to give very fast response although it uses somewhat heavier currents in the control than some of the other systems already described. In this scheme a low value, variable resistor is inserted in the generator load circuit in series with the arc. A load current sensing device is used to control the value of the resistance thus put in series. In a sense this is the "strong arm" method of control and its principal advantage is in the speed of its corrective action as contrasted with controls associated with the generator field circuit. The latter involves substantial time lags due to the electrical characteristics of the generator.

FIG. 14 shows a particularly desirable scheme for sensing the load current and using this to modify the current between the exciter and the field. In this scheme the exciter and field rheostat are replaced by an alternating current power supply. By use of rectifier and filter there is provided a source of controlled direct current for the generator field. The magnetic amplifier-fired SCR (silicon controlled rectifier) provides for phase firing. It is a relatively simple thing to control the firing as previously explained in connection with FIG. 2 and this is an excellent way to control the generator current output within very narrow limits.

The discussion in this patent has been limited to rotating-type welding power supplies. A rectifier-type power supply also is used in welding. Single or multiphase power is brought into the machine and stepped down, controlled, and rectified, and direct current power is put out of the machine for welding use.

The system of FIG. 2 could be used as a rectifier-type welding supply if the SCR bridge was higher in current capacity and the output voltage reduced. Instead of using its power to control current through the field windings of a generator it could supply welding current directly. Gated-voltage, constant-current control with any constant-voltage rectifier-type welding power supply could be obtained in a similar fashion as with the modified system in FIG. 12. The welding voltage reference or selection knob of the welding rectifier could be limited in movement with mechanical stops, and the knob position could be controlled with a motor as with the system in FIG. 4. Also, as with the modified system of FIG. 2, the welding rectifier power supply could be controlled with systems of FIGS. 3, 5, 8, 9, and 10. Another method of controlling a rectifier-type welding power supply would be to use the power output normally used in the field windings of the generator of the system in FIG. 2 or 12 as saturating power in the magnetic amplifier or saturable reactor if the rectifier be of this type.

It will be understood that "relatively constant," as applied to load current, means constant within about ±1 percent unless a more limited tolerance is indicated. In broad terms, current is controlled within such limits without allowing the voltage to wander very far, preferably not more than ±10 percent and at most about ±15 percent. In broad terms, control is obtained by rapidly changing the generator field current in the proper direction. In this sense, a "rapid" change is one which forcibly overcomes the inductance lag in the field. It is an active and not a passive correction.

Obviously many variations may be made in the control system and it is intended by the claims which follow to cover such as come fairly within the scope of this invention as far as the prior art properly permits.

We claim:

1. A system for maintaining a substantially constant current in a welding arc comprising, in combination, means for supplying a controllable arc current for use in a welding operation, an arc circuit operably connected to said means for supplying a controllable arc current for receiving and supplying said arc current to produce the welding arc, said circuit including means for sensing variations in said arc current, a control circuit connected with said arc circuit and having an impedance variable in response to said sensed variations in arc current, said control circuit being coupled to the current supply means for regulating the current produced thereby so as to maintain a substantially constant arc current, and means connected in operable circuit relation with said impedance for limiting the extent of variation of said impedance thereby to maintain the voltage of the arc circuit within about ±15 percent of a desired mean value.

2. A system according to claim 1 wherein the sensing means includes at least one element connected in series relation with said arc current for detecting minute variations in the arc current, and wherein the variation of said impedance in response to the sensed variation in arc current is effective to keep current swings within about ±1 percent of a desired mean value.

3. The system according to claim 1 wherein the variable impedance includes a compressible carbon pile and the means for varying the impedance comprises a solenoid operated lever responsive to said sensed variations.

4. The system according to claim 1 wherein the means for varying said impedance includes a reversible motor equipped with limit stops.

5. The system according to claim 1 wherein the means for varying said impedance comprises a series of stepping resistors, and further including means for inserting said resistors in sequential relation into said control circuit.

6. The system according to claim 1 wherein the means for varying said impedance includes a bleeder network capable of inserting continuously variable impedance into the control circuit.

7. A system according to claim 1 wherein the means for sensing variations in said arc current and the control circuit include a relay system.

8. In combination, a direct current welding generator having field and armature circuits for producing heavy currents at relatively low voltages and control means for keeping said currents at relatively constant value while permitting moderately wider voltage swings not in excess of about ±15 percent of a predetermined mean value, said control means comprising a controlled power section for supplying current to said field circuit, said power section including impedance means connected in the generator field circuit and having a plurality of different operating states for regulating current supplied to said field circuit, and circuit means for sensing variations in generator load current and producing a control signal which is a function of said sensed variations, and means for coupling said control signal to said power section for automatically and rapidly changing the operating state of said impedance means so as to compensate for any variation in said load current and to keep the armature current within about ±1 percent of a predetermined value.

9. The system according to claim 1 wherein the supply means comprises a direct current shunt wound generator.

10. The system according to claim 1 wherein a separately powered circuit provides a reference bias for said control circuit.

11. The system according to claim 10 wherein the separately powered circuit includes a rectifier bridge.

12. An electrical system for supplying a heavy direct current to a welding arc which comprises, in combination, a controllable source of direct current supply for producing arc current, circuit means connected for detecting small variations in said arc current, control means connected between said circuit means and said controllable source operable by said circuit means in response to any detected variation for producing a control signal that will effect a corrective change in said source thereby compensating for any significant deviation from a desired value, and means operably connected in said circuit means and to said control means for imposing upper and lower voltage limits on arc voltage that define a narrow range of voltage deviation from a desired mean value.

13. A system according to claim 11 wherein said control means includes an impedance that is variable in response to any variations detected by said circuit means.

14. A system according to claim 11 wherein said control means produces a control voltage that is a function of the variation in arc current detected by said circuit means.

15. A system according to claim 12 wherein the detecting means includes a resistance in series with the source and the control means includes a rectifier bridge circuit.

16. A system according to claim 12 wherein the said control means for effecting the change in said source includes a reversible motor equipped with limit stops.